United States Patent [19]

Ramsey et al.

[11] Patent Number: 5,955,205
[45] Date of Patent: *Sep. 21, 1999

[54] STRETCH CLING FILM AND FABRICATION METHOD

[75] Inventors: David B. Ramsey, Angleton; Kenneth B. Stewart, Lake Jackson, both of Tex.

[73] Assignee: The Dow Chemical Company, Midland, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/483,786

[22] Filed: Jun. 7, 1995

Related U.S. Application Data

[62] Division of application No. 08/163,805, Dec. 8, 1993, abandoned.

[51] Int. Cl.⁶ .................................................. B32B 27/32
[52] U.S. Cl. ........................ 428/516; 428/218; 428/516; 428/517; 428/519; 428/521; 428/523
[58] Field of Search ................... 428/218, 515, 428/516, 517, 519, 521, 523

[56] References Cited

U.S. PATENT DOCUMENTS

| | | |
|---|---|---|
| 3,025,167 | 3/1962 | Butler . |
| 3,501,363 | 3/1970 | Kirkpatrick . |
| 3,508,944 | 4/1970 | Henderson et al. . |
| 3,817,821 | 6/1974 | Gallini . |
| 3,986,611 | 10/1976 | Dreher . |
| 4,022,646 | 5/1977 | Casey . |
| 4,050,211 | 9/1977 | Wahman . |
| 4,082,877 | 4/1978 | Shadle . |
| 4,147,827 | 4/1979 | Breidt, Jr. et al. . |
| 4,189,420 | 2/1980 | Sugimoto et al. . |
| 4,194,039 | 3/1980 | Mueller . |
| 4,303,710 | 12/1981 | Bullard et al. . |
| 4,311,808 | 1/1982 | Su . |
| 4,327,009 | 4/1982 | Allen et al. . |
| 4,348,455 | 9/1982 | Clayton . |
| 4,362,835 | 12/1982 | Phillips, Jr. . |
| 4,364,981 | 12/1982 | Horner et al. . |
| 4,367,256 | 1/1983 | Biel . |
| 4,379,197 | 4/1983 | Cipriani et al. . |
| 4,399,173 | 8/1983 | Anthony et al. . |
| 4,399,180 | 8/1983 | Briggs et al. . |
| 4,409,776 | 10/1983 | Usui . |
| 4,415,691 | 11/1983 | Allen et al. . |
| 4,418,114 | 11/1983 | Briggs et al. . |
| 4,425,268 | 1/1984 | Cooper . |
| 4,430,457 | 2/1984 | Dobreski . |
| 4,436,788 | 3/1984 | Cooper . |
| 4,504,434 | 3/1985 | Cooper . |
| 4,518,654 | 5/1985 | Eichbauer et al. . |
| 4,521,573 | 6/1985 | Lee et al. . |
| 4,522,987 | 6/1985 | Hogan et al. . |
| 4,542,188 | 9/1985 | van der Heijden . |
| 4,588,650 | 5/1986 | Mientus et al. . |
| 4,612,221 | 9/1986 | Biel et al. . |
| 4,657,982 | 4/1987 | Breck et al. . |
| 4,664,866 | 5/1987 | van der Heijden . |
| 4,671,987 | 6/1987 | Knott, II et al. . |
| 4,680,330 | 7/1987 | Berrier et al. . |
| 4,754,594 | 7/1988 | Lancaster . |
| 4,779,396 | 10/1988 | Stackhouse . |
| 4,833,017 | 5/1989 | Benoit . |
| 4,923,750 | 5/1990 | Jones . |
| 4,996,094 | 2/1991 | Dutt . |
| 5,019,315 | 5/1991 | Wilson . |
| 5,020,300 | 6/1991 | Casteel . |
| 5,030,506 | 7/1991 | Yamawaki et al. . |
| 5,049,423 | 9/1991 | German, Jr. . |
| 5,054,263 | 10/1991 | Mäki-Rahkola et al. . |
| 5,066,526 | 11/1991 | German, Jr. . |
| 5,085,927 | 2/1992 | Dohrer . |
| 5,093,188 | 3/1992 | Dohrer . |
| 5,112,674 | 5/1992 | German et al. . |
| 5,114,763 | 5/1992 | Brant et al. . |
| 5,141,809 | 8/1992 | Arvedson et al. . |
| 5,147,709 | 9/1992 | Dohrer et al. . |
| 5,173,343 | 12/1992 | Arvedson et al. . |
| 5,175,049 | 12/1992 | Huff et al. ............................. 428/218 |
| 5,206,075 | 4/1993 | Hodgson, Jr. ......................... 428/216 |
| 5,208,096 | 5/1993 | Dohrer .................................. 428/218 |
| 5,212,001 | 5/1993 | Brant et al. . |
| 5,261,536 | 11/1993 | Wilson . |
| 5,272,236 | 12/1993 | Lai et al. .............................. 526/160 |
| 5,273,809 | 12/1993 | Simmons . |
| 5,292,560 | 3/1994 | German . |
| 5,296,580 | 3/1994 | Matsunaga et al. . |
| 5,334,428 | 8/1994 | Dobreski et al. . |
| 5,444,145 | 8/1995 | Brant et al. .......................... 526/348.3 |
| B1 4,518,654 | 10/1990 | Eichbauer et al. . |

FOREIGN PATENT DOCUMENTS

| | | |
|---|---|---|
| 0 047 634 | 3/1982 | European Pat. Off. . |
| 0 287 272 | 10/1988 | European Pat. Off. . |
| 0 600 425 A1 | 6/1994 | European Pat. Off. ........ B32B 27/32 |
| 55-19528 | 7/1978 | Japan . |
| 92/14784 A2 | 9/1992 | WIPO ............................ C08L 23/08 |
| 93/03093 A1 | 2/1993 | WIPO ............................ C08L 23/04 |
| 94/09060 A1 | 4/1994 | WIPO ............................ C08J 5/18 |

OTHER PUBLICATIONS

Anonymous, "Unwinding of Polybutene Tackified Polyethylene Pallet Stretch Wrap Films with Reduced Noise", *Research Disclosure*, vol. 1995, Sep. 1995, pp. 595–596.

Japanese Patent 55–19528, Japanese Patent Laid–Open No. 19528/1980 Translation, pp. 1–18.

Reexamination Certificate (1363rd) of U S. Patent 4,518,654 issued Oct. 2, 1990 (B1 4,518,654), Eichbauer et al.

Certificate of Correction dated Jul. 24, 1992 with U.S. Patent 3,025,167 issued Mar. 13, 1962.

*Primary Examiner*—Ana Woodward

[57] ABSTRACT

Multilayer thermoplastic stretch wrap film having substantial one-sided cling properties is made without the use of polymers with high levels of n-hexane extractables, dissimilar polymer chemistries, or low molecular weight tackifiers. The reverse or cling layer comprises at least one homogeneously branched ethylene polymer composition having a density of about 0.90 g/cc or less and the obverse or non-cling layer comprises an propylene or ethylene polymer composition having a density greater than 0.90 g/cc. The multilayer film is particularly useful for load palletization end-use applications.

15 Claims, 1 Drawing Sheet

STRETCH CLING FILM AND FABRICATION METHOD

CROSS-REFERENCE TO RELATED APPLICATIONS

This application is a divisional of application Ser. No. 08/163,805, filed Dec. 8, 1993, now abandoned which is related to issued U.S. Pat. No. 5,272,236, application Ser. No. 07/776,130, filed Oct. 15, 1991; issued U.S. Pat. No. 5,278,272, application Ser. No. 07/939,281, filed Sep. 2, 1992; and issued U.S. Pat. No. 5,562,958, application Ser. No. 08/055,063, filed Apr. 28, 1993, the disclosures of all of which are incorporated herein by reference.

FIELD OF THE INVENTION

This invention pertains to multilayer thermoplastic stretch wrap film, a method for forming such film and the use of such film for load palletization wrapping. The invention particularly pertains to polyolefin stretch wrap film having substantial one-sided cling properties without the use of functional polymers such as ethylene methacrylate copolymers or low molecular weight tackifiers such as polyisobutylene.

BACKGROUND OF THE INVENTION

Stretch films that self-seal when portions are overlapped are known as "cling" films. These films are most often multilayer films and are used in applications where it's desirable to securely hold and/or wrap an article or group of articles, such as load palletization. For load palletization operations, the film is stretched tightly around the good or plurality of goods situated on a pallet, and self-sealed while the film is still in the stretched condition to create a secure, unitized package. Both unstretched or pre-stretched films are used for load palletization and retention of substantial cling properties and good tear properties while the film is stretch-wrapped are required to maintain the integrity of the unitized load.

There are several deficiencies associated with known cling films. For instance, many cling films are characterized as having substantial cling properties on both their outer ("obverse") layer and their inner ("reverse") layer. These two-sided cling films retain unsightly dirt and dust and undesirably adhere to adjacent goods and similarly wrapped packages when abutted against one another. Adhesion to adjacent goods and packages typically causes ripping, tearing, distortion and/or unraveling of the film during subsequent handling.

As disclosed in U.S. Pat. Nos. 5,175,049 and 3,025,167, cling films are often prepared by the addition of minor amounts of low molecular weight tackifiers. Common tackifiers include polybutylenes, mono- and diglycerides of fatty acids, amorphous polypropylenes, terpene resins and rosin esters. Tackifiers are non-film-forming, migratory materials that can cause die lip build-up during film fabrication and undesirable accumulations on equipment during wrapping operations. Die lip build-up and other accumulations on equipment require periodic stoppage of operations for cleaning and maintenance. Moreover, tackifiers often migrate to adjacent and opposite film layers and cause the aforementioned undesired adhesion and dirt retention problems commonly associated with two-sided cling films.

U.S. Pat. No. 5,093,188 teaches cling films comprising blends and/or multilayer constructions of chemically distinct polymers. An example of a cling film based on chemically distinct polymers is disposed in U.S. Pat. No. 5,172,343 where an ethylene acrylate cling layer is used opposite a polypropylene or polyethylene non-cling layer. However, the use of functional polymers such as ethylene acrylate polymers and ethylene vinyl acetate polymers can present rheology matching problems in coextrusions with linear polyethylene as well as thermal instability and incompatibility problems during recycling of edge trim and film scrap generated during the film fabrication step. While rheological, instability and incompatibility problems can be mitigated to some extent by the use of extrusion-grafted linear polyethylene polymers as the functional polymer layer, as opposed to using the more common high-pressure autoclave produced polymers, these problems are not completely eliminated by employing the extrusion-grafted linear polyethylene polymers.

The addition of tackifiers or the use of functional polymer layers are allegedly not required for some prior art films. For example, EPO 0 287 272 discloses cling films can be prepared from heterogeneously branched linear low density polyethylene (LLDPE) with relatively high levels of n-hexane extractables. Preferred LLDPE polymers have a density in the range of 0.905 grams per cubic centimeter (g/cc) to 0.940 g/cc. However, these films tend to show inconsistent cling properties as well as the accumulation and migration shortcomings generally associated with cling films prepared by the addition of tackifiers.

Stretch wrap films having only one outer layer with substantial cling properties are known as one-sided cling films. Ordinarily, the obverse layer is the "non-cling" layer of the one-sided cling film and it forms the exterior of a package or wrapped article.

One-sided cling films can be prepared by corona discharge treatment of monolayer and multilayer films. However, as indicated in U.S. Pat. No. 4,425,268, functional polymers and copolymers are still required to obtain the desired cling properties. As such, and since functional polymers generally do not exhibit sufficient strength properties for stretch wrapping operations, multilayer constructions involving high strength linear polyethylene layers are more frequently used.

Typical multilayer constructions comprise an A/B or A/B/C film structure where the A layer is the cling or reverse layer and the B layer (or the C layer in an A/B/C construction wherein the B layer is a core or structural layer) is the non-cling or obverse layer. However, as discussed above, multilayer cling films usually comprise polymers with high levels of n-hexane extractables, low molecular weight tackifiers, or functional ethylene polymers or grafted polymers, or combinations thereof. There are several disclosures that relate to such multilayer cling films, including U.S. Pat. Nos. 3,501,363 3,508,944, 3,817,821, 3,986,611, 4,022,646, 4,082,877, 4,303,710, 4,348,455, 4,399,180, 4,364,981, 4,379,197 4,418,114, 4,425,268, 4,436,788, 4,504,434, 4,518,654, 4,542,188, 4,588,650, 4,612,221, 4,671,987, 4,833,017, 4,923,750, 5,049,423, 5,066,526, 5,093,188, 5,114,763, 5,141,809, 5,175,049, 5,208,096, and 5,212,001, all of which are incorporated herein by reference. While multilayer films are most often used for stretch cling wrapping operations, the multilayer construction in itself does not resolve the aforementioned deficiencies. These deficiencies are largely due to polymer selection and their respective chemistries and, generally, are not due to how the materials are brought together or fabricated into film.

Multilayer films can be successfully produced by number of well known methods including coextrusions and hot nip and adhesive film laminations as described in the various references incorporated herein. Load palletization can also be successfully accomplished manually or by a number of automated methods including the methods and apparatus described in U.S. Pat Nos. 5,054,263, 5,020,300, 4,779,396, and 4,754,594. However, overall deficiencies of inconsistent cling properties, die lip build-up, accumulations on equipment, and recycle incompatibility continue to persist in the art of stretch cling films.

GLOSSARY AND TEST METHODS

The terms "homogeneous branching distribution" and "homogeneously branched" are defined herein to mean that (1) the α-olefin monomer is randomly distributed within a given molecule, (2) substantially all of the copolymer molecules have the same ethylene-to-α-olefin monomer ratio, (3) the polymer is characterized by a narrow short chain branching distribution wherein the composition distribution branch index is greater than 30 percent, preferably greater than 50 percent, (4) the polymer essentially lacks a measurable high density (crystalline) polymer fraction as measured by known fractionation techniques such as, for example, a method that involves polymer fractional elutions as a function of temperature, and (5) the polymer is characterized as having substantially reduced levels of n-hexane extractables or substantial amorphism as determined by the FDA test method published as 21 CFR 177.1520(c). By substantial amorphism, it is meant that greater than 75 weight percent of the whole polymer is soluble under prescribed test conditions.

The term "narrow short chain distribution" as applied herein pertains to the distribution of α-olefin monomer branches of the polymer as characterized by its SCBDI (Short Chain Branch Distribution Index) or CDBI (Composition Distribution Branch Index). The term is defined herein as greater than about 30 weight percent of the polymer molecules have an α-olefin monomer content within 50 percent of the median total molar α-olefin monomer content. The CDBI of a polymer is readily calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), or in U.S. Pat. No. 4,798,081, both disclosures of which are incorporated herein by reference.

The term "film-forming" is defined herein to mean the material or polymer has sufficient molecular weight and melt strength to allow a practitioner to conveniently fabricate it as a monolayer film or coextrusion layer on conventional extrusion equipment using conventional techniques without the addition of another material, another polymer or a processing aid.

The term "linear polyethylene" is defined herein as an ethylene polymer characterized as have no long chain branching as defined hereinabove. The term does not refer to high pressure, free-radical polymerized polyethylenes such as low density polyethylene (LDPE), ethylene/vinyl acetate (EVA) copolymers, ethylene/acrylic acid (EAA) copolymers, or ethylene/vinyl alcohol (EVOH) copolymers which are known to those skilled in the art to have numerous long chain branches.

The term "interpolymer" is used herein to indicate a copolymer, or a terpolymer, or the like, where, at least one other monomer is interpolymerized with ethylene to make the polymer.

The term "substantially linear" means that the polymer backbone is substituted with about 0.01 long chain branch/ 1000 carbons to about 3 long chain branches/1000 carbons, more preferably from about 0.01 long chain branch/1000 carbons to about 1 long chain branch/1000 carbons, and especially from about 0.05 long chain branch/1000 carbons to about 1 long chain branch/1000 carbons.

The term "long chain branched" is defined herein as a chain length of at least about 6 carbons, above which the length cannot be distinguished using $^{13}$C nuclear magnetic resonance spectroscopy, yet the long chain branch can be about the same length as the length of the polymer backbone. Long chain branching is determined by using $^{13}$C nuclear magnetic resonance (NMR) spectroscopy and is quantified using the method described by Randall (*Rev. Macromol. Chem. Phys.*, C29, V. 2&3, p. 285–297), the disclosure of which is incorporated herein by reference.

The term "ultra low density polyethylene" (ULDPE) is also known in the linear polyethylene art as "very low density polyethylene" (VLDPE) and "linear very low density polyethylene" (LVLDPE) and herein designates a density less than about 0.915 g/cc. "Medium density polyethylene" (MDPE) is also known in the art as "linear medium density polyethylene" and herein designates a density in the range of about 0.930 to about 0.945 g/cc. "Linear low density polyethylene" (LLDPE) herein designates a density in the range of about 0.916 to about 0.929 g/cc. "High density polyethylene" (HDPE) herein designates a density greater than about 0.945 g/cc.

The term "non-cling" is defined herein as the amount of cling of a given layer that is insufficient to obtain a good self-seal when used in stretch cling operations although the layer may actually exhibit a small amount of measurable cling.

The density of the various polymers used to make the multilayer one-sided cling film of the present invention is measured in accordance with ASTM D-792 and is reported as g/cc.

The film of the present invention is tested for reverse layer-to-obverse obverse layer cling and obverse layer-to-obverse layer cling according to ASTM D 4649 § A.3 & A1.2.3, Test Methods for Peel Cling of Thin Films and is reported as the force in grams required to separate two strips of film. For stretched-film cling determinations, a 1"×7" (25 mm×178 mm) strip of the film to be tested is stretched 200 percent and attached to a 20 degree inclined plane with the obverse layer (non-cling) facing upward. A second, unstretched 1"×7" (25 mm×178 mm) strip of film is placed on top of the first strip with the reverse layer or another obverse layer facing downward. Sufficient pressure is applied with a brush to cause the two strips to adhere together. The end of the second strip at the base of the incline plane is attached, by a clip and a string, to an apparatus which can exert a strain at a constant rate, such as an Instron Tensile Tester. The two strips are separated at a crosshead speed of 5 inches/minute (13 centimeters/minute) until the attached string is parallel with the base of the inclined plane. In general, stretched cling values are appreciable less than unstretched values.

Melt index measurement is performed according to ASTM D-1238, Condition 190° C./2.16 kilogram (kg), formerly known as "Condition E" and also known as $I_2$. Melt index is inversely proportional to the molecular weight of the polymer. Thus, the higher the molecular weight, the lower the melt index, although the relationship is not linear. Melt index is reported as g/10 minutes.

Melt index determinations can also be performed with higher weights, such as in accordance with ASTM D-1238, Condition 190° C./10 kg (formerly known as "Condition N" and also known as $I_{10}$). The term "melt flow ratio" as defined herein is the ratio of a higher weight melt index determination to a lower weight determination, and for measured $I_{10}$ and the $I_2$ melt index values, the melt flow ratio is conveniently designated as $I_{10}/I_2$.

SUMMARY OF INVENTION

The present invention is a novel multilayer film comprising at least two layers, having substantial cling properties on one side and adapted for use as a stretch wrapping material. The new multilayer film comprises:

a reverse layer comprising at least one film-forming homogeneously branched ethylene polymer composition having a density of about 0.90 g/cc or less than about 0.90 g/cc, an obverse layer comprising at least one film-forming olefin polymer composition having a density above about 0.90 g/cc, and, optionally, at least one core or structural layer comprising at least one high strength ethylene polymer composition.

The obverse layer exhibits significantly less cling than the reverse layer. The core or structural layer can be varied to meet application-specific film strength requirements.

In accordance with the present invention, film prepared with one-sided cling properties are especially useful in stretch wrapping, stretch-bundling and tension-winding operations for wrapping or holding small and large goods. The one-sided cling film of the present invention is provided without the need for tackifying additives or functional polymers.

The benefits of this invention includes: substantially reduced or eliminated: die-lip build, accumulation and migration of low molecular weight materials. This means that cleaning and maintenance time will be reduced during film fabrication and wrapping operations. Problems pertaining to adhesion to adjacent goods and packages as well as surface retention of dirt, dust and debris will also be reduced.

Another aspect of this invention is to provide a one-sided cling film comprising polymers with similar rheologies and monomer chemistries, and thereby facilitate improved melt viscosity matching during coextrusions and good polymer compatibility for recycling purposes.

Another aspect of this invention is to provide a one-sided cling film where high cling is not diminished when the film is under stretched conditions such that the inventive film shows equivalent stretched and unstretched cling properties.

DETAILED DESCRIPTION OF THE INVENTION

Figure 1:
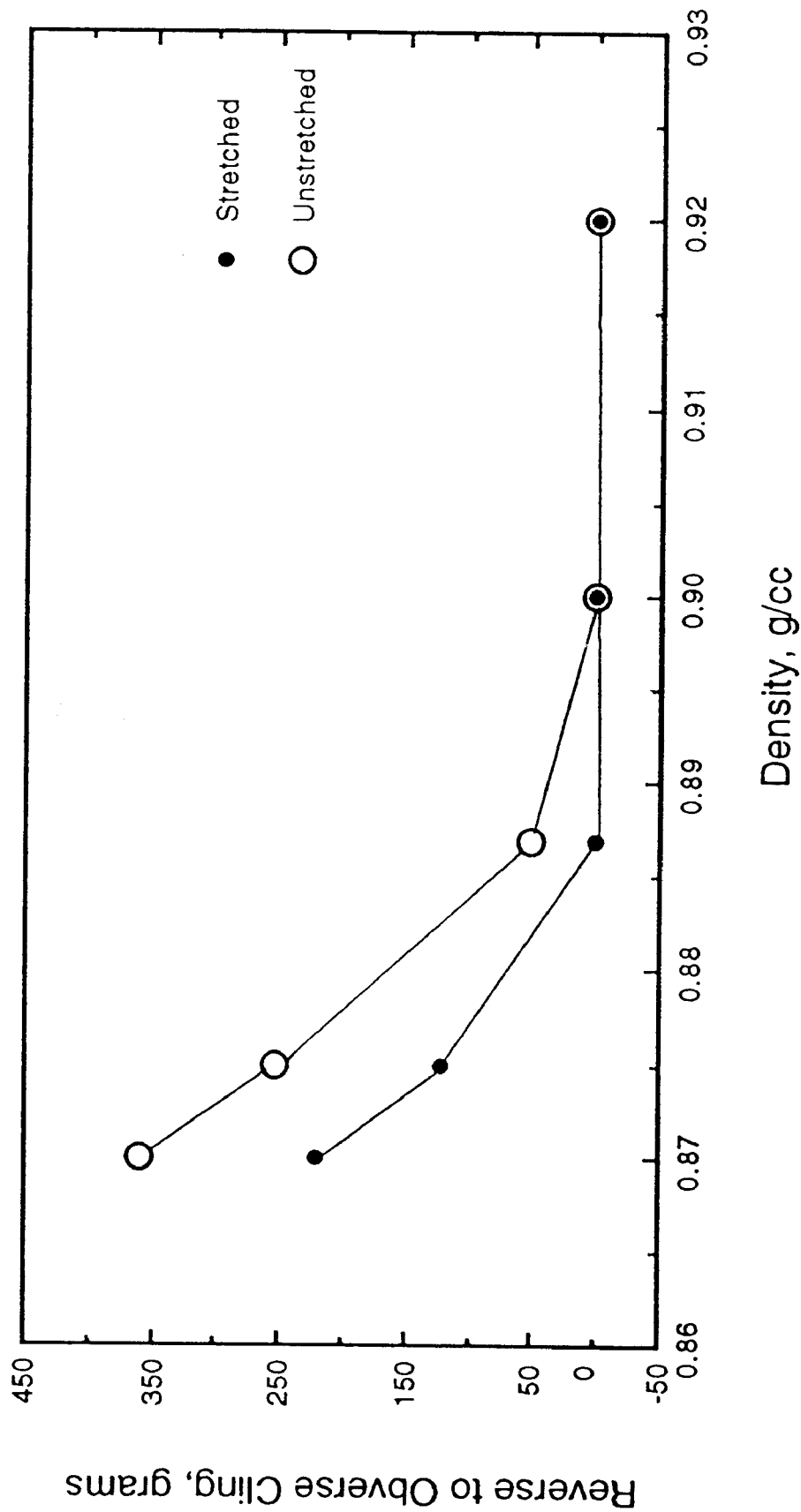
FIG. 1 is a graph that corresponds to the data in Table 4 and relates the density of homogeneously branched ethylene polymers to the reverse-to-obverse cling properties of unstretched and stretched A/B/C multilayer films.

It has been discovered that the amount of cling relates to the density of the polymer or blend combination that forms the reverse and obverse layers of the film; as density of the polymer in the reverse layer is decreased, cling properties improve. A reverse layer of this invention will show substantial cling to an obverse layer when the density of the reverse layer is 0.90 g/cc or less, preferably in the range of about 0.85 g/cc to about 0.89 g/cc, and more preferably, in the range of about 0.86 g/cc to about 0.88 g/cc. The density of an obverse layer of this invention is greater than 0.90 g/cc, preferably in the range of about 0.91 g/cc to about 0.96 g/cc, and more preferably, in the range of about 0.93 g/cc to about 0.95. Obverse layers in the more preferred density range of about 0.93 g/cc to about 0.95 g/cc provide one-sided cling films with equivalent stretch and unstretched cling properties.

The density of a core layer or structural layers included in the multilayer film of this invention can be varied to meet total film strength requirements depending on the end-use application.

The film-forming homogeneously branched ethylene polymer composition having a density of about 0.90 g/cc or less than about 0.90 g/cc that comprise the reverse layer of the present invention includes homogeneously branched linear ethylene polymer substantially linear ethylene polymers and blend combinations thereof. Preferably, the reverse layer comprises a substantially linear ethylene polymer and, more preferably, the substantially linear ethylene polymer is prepared by a solution process wherein ethylene is polymerized with 1-octene. Substantially linear ethylene polymers are preferred due to their favorable rheological properties.

The film-forming homogeneously branched ethylene polymers used to form the multilayer film of the present invention will show reduced n-hexane extractables that generally increase at a low level as polymer density is decreased. However, surprisingly at polymer densities less than 0.90 g/cc, these polymers become substantially amorphous and yet can be readily formed into wrapping films.

The film-forming olefin polymer composition having a density greater than 0.90 g/cc that comprise the obverse layer of the present invention includes propylene and ethylene polymers such as polypropylene, ethylene propylene copolymers, low density polyethylene (LDPE), medium density polyethylene (MDPE), high density polyethylene (HDPE), substantially linear ethylene polymers, heterogeneously and homogeneously branched linear ethylene copolymers and blend combinations thereof. Preferably, the obverse layer comprises polypropylene, such as, for example, polypropylene in blend combination with MDPE or HDPR. MDPE alone can also be used and is preferred due to its ability to provide equivalent stretched and unstretched cling properties.

The ethylene polymer that comprise a core or structural layer of the present invention includes low density polyethylene (LDPE), medium density polyethylene (MDPE), high density polyethylene (HDPE), substantially linear ethylene polymers, heterogeneously and homogeneously branched linear ethylene copolymers. Preferably, the core or structural layer comprises fractional melt index low density polyethylene or LLDPE, more preferably, linear low density polyethylene (LLDPE) and, most preferably, the LLDPE is prepared by a solution process wherein ethylene is polymerized with 1-octene. LLDPE is preferred due to its known superior film strength properties.

Heterogeneously branched VLDPE and LLDPE are well known among practitioners of the linear polyethylene art. They are prepared using Ziegler-Natta solution, slurry or gas phase polymerization processes and coordination metal catalysts as described, for example, by Anderson et al. in U.S. Pat. No. 4,076,698, the disclosure of which is incorporated herein by reference. These Ziegler-type linear polyethylenes are not homogeneously branched and they do not have any long-chain branching. Also, these polymers do not show any substantial amorphism at lower densities since they inherently posses a substantial high density (crystalline) polymer fraction. At a density less than 0.90 g/cc, these materials are very difficult to prepare using conventional Ziegler-Natta catalysis and are also very difficult to pelletize. The pellets are tacky and tend to clump together.

Homogeneously branched linear ethylene copolymers are also well known among practitioners of the linear polyethylene art. See, for example, Elston disclosure in U.S. Pat. No. 3,645,992. They can be prepared in solution, slurry or gas phase processes using zirconium and vanadium catalyst systems. Ewen et al. in U.S. Pat. No. 4,937,299 described a method of preparation using metallocene catalysts. The disclosures of Elston and Ewen are incorporated herein by reference. This second class of linear polyethylenes are homogeneously branched polymers, but like the Ziegler-type heterogeneous linear polyethylene, they do not have any long-chain branching. Commercial examples of these polymers are sold by Mitsui Chemical under the designation "TAFMER" and by Exxon Chemical under the designation "EXACT".

The substantially linear ethylene polymers used in the present invention are a unique class of compounds that are further defined in U.S. Pat. No. 5,272,236, application Ser. No. 07/776,130 filed Oct. 15, 1991 and in U.S. Pat. No. 5,278,272, application Ser. No. 07/939,281 filed Sep. 2, 1992, the teachings of all of which are incorporated herein by reference., The teachings disclosed in these copending applications include the utilization of constrained geometry catalysts and suitable methods of production.

Substantially linear ethylene polymers are homogeneously branched but, unlike other homogeneously branch ethylene polymers, substantially linear ethylene polymers are characterized as having long chain branching and as having:

a) a melt flow ratio, $I_{10/I2} \geq 5.63$, b) a molecular weight distribution, $M_w/M_n$, defined by the equation: $M_w/M_n \leq (I_{10}/I_2) - 4.63$, and c) a critical shear rate at onset of surface melt fracture at least 50 percent greater than the critical shear rate at the onset of surface melt fracture of either a homogeneously or heterogeneously branched linear ethylene polymer having about the same $I_2$ and $M_w/M_n$.

A unique characteristic of the substantially linear ethylene polymers used to prepare the multilayer stretch wrap materials of this invention is a highly unexpected flow property where the $I_{10}/I_2$ value of the polymer is essentially independent of the polydispersity index (i.e. $M_w/M_n$) of the polymer. This is contrasted with linear homogeneously branched and linear heterogeneously branched polyethylenes which have rheological properties such that as the $I_{10}/I_2$ value increases, the respective polydispersity index also increases. In addition, substantially linear ethylene polymers also exhibit enhanced processability as manifested by a higher extrusion output, lower pressure drop through screen packs and gel filters, lower extruder amperage and lower die pressure as well as excellent melt strength and non-tackiness at lower polymer densities that permit efficient pelletization.

To characterize the rheological behavior of substantially linear ethylene polymers, S. Lai and G. W. Knight introduced (*ANTEC '93 Proceedings*, INSITE™ Technology Polyolefins (ITP)—New Rules in the Structure/Rheology Relationship of Ethylene α-Olefin Copolymers, New Orleans, La., May 1993) a new Theological measurement, the Dow Rheology Index (DRI), which expresses a polymer's "normalized relaxation time as the result of long chain branching." DRI ranges from 0 for polymers which do not have any measurable long chain branching (e.g., "TAFMER" and "EXACT" products) to about 15 and is independent of melt index. In general, for low to medium pressure ethylene polymers (particularly at lower densities) DRI provides improved correlations to melt elasticity and high shear flowability relative to correlations of the same attempted with melt flow ratios, and for the substantially linear ethylene polymers of this invention, DRI is preferably at least about 0.1, and especially at least about 0.5, and most especially at least 0.8. DRI can be calculated from the equation:

$$DRI = (3652879 * t_O^{1.00649}/h_O - 1)/10$$

where to is the characteristic relaxation time of the material and $h_O$ is the zero shear viscosity of the material. Both $t_O$ and $h_O$ are the "best fit" values to the Cross equation, i.e.

$$\eta/\eta_o = 1/(1+(\gamma^* \tau_O)^{1-n})$$

where n is the power law index of the material, and h and g are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160° C. and a Gas Extrusion Rheometer (GER) at extrusion pressures from 1,000 psi to 5,000 psi (6.89 to 34.5 MPa), which corresponds to shear stress from 0.086 to 0.43 MPa, using a 7.54 centimeter diameter, 20:1 L/D die at 190° C. Specific material determinations can be performed from 140 to 190° C. as required to accommodate melt index variations.

The film-forming homogeneously branched ethylene polymer compositions used for the reverse layer, and the film-forming olefin polymer composition used for the obverse layer, and the high strength ethylene polymer composition used for the core or structural layer of this invention are ethylene polymers which are prepared by homopolymerizing ethylene or interpolymerizing ethylene with a minor amount of a variety of monomers. Suitble such monomers include ethylenically unsaturated monomers, conjugated or non-conjugated dienes, polyenes, and the like. Examples of such comonomers include $C_3$–$C_{20}$ α-olefins as propylene, isobutylene, 1-butene, 1-hexene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

Additives such as cling additives and tackifiers(e.g., PIB), slip and antiblock agents, antioxidants (e.g., hindered phenolics such as Irganox® 1010 or Irganox® 1076 supplied by Ciba Geigy), phosphites (e.g., Irgafos® 168 also supplied by Ciba Geigy), Standostab PEPQ™ (supplied by Sandoz), pigments, colorants, fillers, processing aids and the like, although not required to achieve the desired results of this invention, can also be included in the stretch wrapping material disclosed herein. However, the additives should incorporated in such manners or to the extent that they do not interfere with the substantial cling and non-cling properties discovered by Applicants.

The multilayer film of the present invention may be constructed from two or more film layers including A/B and A/B/C film structures by any film lamination and/or coextrusion technique and any blown or cast film extrusion equipment known in the art. However, the preferred construction is an A/B/C structure prepared by coextrusion techniques, and, more preferably, by cast coextrusion techniques.

Suitable blown film processes are described, for example, in *The Encyclopedia of Chemical Technology*, Kirk-Othmer, Third Edition, John Wiley & Sons, New York, 1981, Vol. 16, pp. 416–417 and Vol. 18, pp. 191–192. A suitable cast extrusion method is described, for example, in Modern Plastics Mid-October 1989 Encyclopedia Issue, Volume 66, Number 11, pages 256 to 257. Suitable coextrusion techniques and requirements are described by Tom I. Butler in Film Extrusion Manual: Process, Materials, Properties, "Coextrusion", Ch. 4, pp. 31–80, TAPPI Press, (Atlanta, Ga. 1992).

The melt index of each polymer layer of the multilayer film of this invention is in the range of about 0.4 to about 20 g/10 minutes, preferably, in the range of about 0.5 to about 12 g/10 minutes and, more preferably, in the range about 0.8 to about 6 g/10 minutes.

The total film thickness of the multilayer film of the present invention is in the range of about 0.4 to about 20 mils, preferably, in the range of about 0.6 to about 10 mils and, more preferably, in the range of about 0.8 to about 5 mils.

The layer ratio for the A/B multilayer film of this invention is greater than 2:98 A layer to B layer, preferably range from about 5:95 to about 35:65 and, more preferably, range from about 10:90 to about 25:75. The ratio layer of multilayer films having more than two layers is such that the reverse and obverse layers of the film is maintained at the same thickness and the ratio of core or structural layer is ranges from about 60 to about 98 weight percent, preferably range from about 65 to about 95 weight percent, and more preferably range from about 70 to about 90 weight percent.

Amorphism and n-Hexane Extractables

Ziegler-type heterogeneously branched linear ethylene (α-olefin polymers inherently possess relatively high levels of n-hexane extractables that permit substantial cling properties. In the density range of 0.905 g/cc to 0.930 g/cc, these polymers typically possess about 1.3 to about 3.0 weight percent n-hexane extractable when measured according to the FDA test method published as 21 CFR 177.1520(c). At densities in the range of about 0.86 to 0.90 g/cc, these polymers are soluble under test conditions up to a maximum of about 65 weight percent. Conversely, Table 1 shows that homogeneously branched ethylene polymers possess relatively low levels of n-hexane extractables at densities greater than about 0.90 g/cc, and are substantially amorphous at a density of about 0.90 g/cc, and completely amorphous at a density of 0.88 g/cc or less.

| Homogeneously Branched Substantial Linear Ethylene/1-Octene Copolymers | |
| --- | --- |
| Density, g/cc | Percent Extractables |
| 0.95 | 0.1 |
| 0.94 | 0.2 |
| 0.92 | 0.4 |
| 0.91 | 0.8 |
| 0.90 | Approx. 90% Soluble Under Test Conditions |
| 0.88 | 100% Soluble Under Test Conditions |

EXAMPLES

The following examples illustrate some of the particular embodiments of the present invention, but the following should not be construed to mean the invention is limited to the particular embodiments shown.

Examples 1–7

Table 2 summarizes the polymers used in an A/B/C cast coextrusion film evaluation.

TABLE 2

| Resin | $I_2$ g/10 min. | Density g/cc | Polymer/Composition Description |
| --- | --- | --- | --- |
| SLEP 1 | 3.0 | 0.875 | A homogeneously branched substantially linear ethylene/1-octene copolymer prepared by a solution polymerization process |
| SLEP 2 | 5.0 | 0.870 | A homogeneously branched substantially linear ethylene/1-octene copolymer prepared by a solution polymerization process |
| SLEP 3 | 3.0 | 0.910 | A homogeneously branched substantially linear ethylene/1-octene copolymer prepared by a solution polymerization process |
| SLEP 4† | 3.0 | 0.900 | A blend of 71.4 wt. % SLEP 3 + 28.6 wt. % SLEP 1 |
| SLEP 5† | 3.0 | 0.887 | A blend of 35 wt. % SLEP 3 + 65 wt. % SLEP 1 |
| SLEP 6† | 3.0 | 0.882 | A blend of 20 wt. % SLEP 3 + 80 wt. % SLEP 1 |
| SLEP 7 | 3.0 | 0.900 | A homogeneously branched substantially linear ethylene/1-octene copolymer prepared by a solution polymerization process |
| VLDPE | 3.2 | 0.900 | A homogeneously branched very low density ethylene/1-butene interpolymer prepared by a gas-phase polymerization process and sold by Exxon Chemical Company under designation the "Exact 3027". |
| EMA | 4.6 | 0.945 | An ethylene methacrylate copolymer containing about 25 weight percent methacrylate and sold by Exxon Chemical Company under the designation "XC-102". |
| HDPE | 7.0 | 0.954 | A high density polyethylene prepared by a solution polymerization process and sold by The Dow Chemical Company under the designation "HDPE 08354N" |
| LLDPE 1 | 2.3 | 0.917 | A heterogeneously branched linear low density ethylene/1-octene copolymer prepared by a solution polymerization process and sold by The Dow Chemical Company under the designation "DOWLEX 3347A" |
| LLDPE 2 | 1.0 | 0.920 | A heterogeneously branched linear low density ethylene/1-octene copolymer prepared by a solution polymerization process and sold by The Dow Chemical under the designation "DOWLEX 2245A" |
| MDPE | 4.0 | 0.941 | A medium density polyethylene prepared by a solution polymerization process and sold by The Dow Chemical Company under the designation "DOWLEX 2027A" |
| PP† | 4.7 | 0.921 | A blend of an isotactic polypropylene sold by Exxon Chemical Company under the designation "PP 4062" blended + a solution process HDPE sold by The Dow Chemical Company under the designation "HDPE 08354N" |
| LDPE† | 2.6 | 0.920 | A blend of a low density polyethylene prepared by a tubular process and sold by The Dow Chemical Company under the designation "LDPE 748I" + a solution LLDPE sold by The Dow Chemical Company under the designation "DOWLEX 2245A" |

†Polymer blend composition prepared by tumble dry-blending, however any known polymer blending technique is suitable for use with the present invention including, for example, extrusion melt blending.

Example 1

One multilayer stretch cling film that is commercially used in the industry is prepared using EMA as the reverse layer, LLDPE 1 as the core or structural layer and PP as the obverse layer. The cast coextrusion film equipment utilized to prepare the comparative sample consists of a three extruder configuration: a 3½ inch (8.9 cm) diameter Egan primary extruder ("B" core or structural layer) with a 32:1 L/D; a 2½ inch (6.4 cm) diameter Egan satellite extruder ("A" reverse layer) with a 24/1 L/D; and a 2 inch (5.1 cm) diameter Davis Standard satellite extruder ("C" obverse layer) with a 24/1 L/D. The molten polymer exits the extruders through an A/B/C feedblock into a 30 inch (76.2 cm) Johnson coat-hanger, flex-lip slot die. The pumping rates of the extruders are adjusted to maintain a 15%/70%/15% film layer thickness ratio as molten polymer is fed through a 0.020 inch (0.05 cm) die gap. The coextruded film contacts two chill rolls cooled to 70° F. (21° C.) at an air/draw gap of 5 inches (12.7 cm).

The cast coextruded film sample is conveniently produced at a nominal total film thickness of 0.8 mil (20 microns), a melt temperature of approximately 400° F. (204° C.) for the A layer and 525° F. (274° C.) for B and C layers, and a line speed of 800 feet per minute (244 meters per minute). The resultant film has an unstretched reverse layer-to-obverse layer cling value of 123 grams and a stretched cling value of 47 grams according toe ASTM D-4649 § A.3.

Table 3 summarizes A/B/C coextruded film constructions of Examples 2–5 of the present invention. The multilayer films are conveniently prepared using the same equipment and settings indicated in Example 1. Extrusion processability is excellent and no die-lip build-up is observable during a 2-hour fabrication trial of these film structures. ASTM D-4649 § A.3 unstretched and 200% stretched cling results for these examples are presented in Table 4.

TABLE 3

| Example | Layer A | Layer B | Layer C |
|---------|---------|---------|---------|
| 2 | SLEP 1 | LLDPE 1 | PP |
| 3 | SLEP 2 | LLDPE 1 | PP |
| 4 | SLEP 2 | LLDPE 1 | MDPE |
| 5 | SLEP 5 | LLDPE 1 | PP |

TABLE 4

| Example | A Layer Density | Unstretched Cling (g) | 200% Stretched Cling (g) |
|---------|-----------------|----------------------|--------------------------|
| 2 | 0.875 | 252 | 122 |
| 3 | 0.870 | 360 | 220 |
| 4 | 0.870 | 339 | 356 |
| 5 | 0.887 | 52 | 0 |

The data in Table 4 demonstrate that films prepared in accordance with the present invention exhibit substantial cling in both the unstretched and the 200% stretched condition. Surprisingly, the film structures that comprise a substantially linear polymer as the cling layer and MDPE as the non-cling layer exhibited (Example 4) equivalent or higher cling values in the 200% stretched condition as compared to the unstretched condition. Furthermore, at a density less than 0.88 g/cc (Examples 2–5), the cling properties of the film of this invention are superior to commercially representative film, Example 1. The inventive films also exhibited good physical properties.

Examples 6–8

An additional cast film evaluation is conducted using the same equipment and extrusion parameters as Example 1 except the "A" reverse,. layer extruder is operated to provide a melt temperature of 500° F. (260° C.) instead of 400° F. (204° C.). Table 5 summarizes the samples that are used for this evaluation.

TABLE 5

| Example | Layer A | Layer B | Layer C |
|---------|---------|---------|---------|
| 6 | SLEP 1 | LLDPE 1 | PP |
| 7 | SLEP 6 | LLDPE 1 | PP |
| 8 | SLEP 7 | LLDPE 1 | PP |

Table 6 summarizes the cling layer density (Layer A), and unstretched and 200% stretched cling values for Examples 6–8.

TABLE 6

| Example | A Layer Density, g/cc | Reverse-to-Obverse Cling, g | |
|---------|----------------------|------------|----------|
| | | Unstretched | Stretched |
| 6 | 0.875 | 280 | 177 |
| 7 | 0.882 | 141 | 77 |
| 8 | 0.888 | 72 | 36 |

As Table 6 illustrates, at higher melt temperatures, the film-forming homogeneously branched substantially linear ethylene polymers (Examples 6–8) exhibit substantial cling properties at a density as high as about 0.89 g/cc. However, the higher fabrication temperature does not produce any observable die lip build-up or accumulation on equipment parts which is normally associated with polymers in the prior art which contain tackifiers and high level of n-hexane extractables.

Examples 9–10

In another evaluation, A/B/C film structure are prepared by a blown coextrusion technique. The blown film coextrusion equipment utilized to fabricate Examples 9 and 10 consists of a three extruder configuration: a 2½ inch (6.4 cm) 60 horsepower Egan outer layer extruder (A layer), a 2½ inch (6.4 cm) 75 horsepower Egan core layer extruder (B layer) and a 2 inch (5.1 cm) Johnson 20 horsepower inner layer extruder (layer C). Molten polymer exits the extruders into a Johnson three-layer 8 inch (20.3 cm) coextrusion spiral mandrel die fitted with a die pin and a 0.07 inch (70 mil) die gap. The pumping rates of the extruders are adjusted to maintain a 15%/70%/15% film layer thickness ratio.

Both coextruded blown film samples are conveniently produced at a nominal total film thickness of 0.8 mil (20 microns), a melt temperature of approximately 360° F. (182° C.) for the A layer extruder, 430° F. (221° C.) for the B layer extruder, and 400° F. (204° C.) for the C layer extruder. Evaluations are conducted at a blow-up ratio (BUR) of 2:1 and a line speed of 170 feet per minute (52 meters per minute). Table 7 summarizes the coextruded blown film structures.

TABLE 7

| Example | Layer A | Layer B | Layer C |
|---|---|---|---|
| 9 | SLEP 1 | LLDPE 2 | LDPE |
| 10* | EMA | LLDPE 2 | LDPE |

*Not an example of the present invention; provided for comparative purposes only.

Table 8, which summarizes the ASTM D-4649 unstretched and 200% stretched cling values for examples 9–10, indicates similar to the multilayer cast film of the present invention, our inventive blown film (Example 9) exhibits significantly better cling properties than a commercially representative film structure (Example 10).

TABLE 8

| Example | Unstretched Cling, g | 200% Stretched Cling, g |
|---|---|---|
| 9 | 142 | 110 |
| 10 | 80 | 52 |

Examples 11–14

In another cast coextrusion evaluation employing the same coextrusion equipment and parameters as described for Examples 1, A/B film structures are prepared. In this evaluation, the both B layer and C layer extruders are operated to provide the obverse and the A extruder is operated to provide the reverse layer. The layer ratio is maintained at 15:85 A/B layers. The nominal total film thickness is 0.8 mils. Table 9 summarizes the respective layer configurations as well as the cling properties for these structures. Table 9 indicates, multilayer film prepared according to the present invention with either a homogeneously branched substantially linear ethylene polymer (Examples 13 and 14) or a homogeneously branched linear ethylene polymer (Examples 15 and 16) exhibits good unstretched cling properties at a reverse layer polymer density of about 0.90 g/cc. In addition, Table 9 indicates that its cling performance is also superior to a comparative film having a reverse layer polymer density of about 0.91 g/cc (Example 12).

TABLE 9

| Example | Reverse | Obverse | Reverse to Obverse Cling Unstretched, g |
|---|---|---|---|
| 12* | SLEP 3 | LLDPE 2 | 0 |
| 13 | SLEP 7 | LLDPE 2 | 57 |
| 14 | SLEP 7 | HDPE | 45 |
| 15 | VLDPE | LLDPE 2 | 37 |
| 16 | VLDPE | HDPE | 28 |

*Not an example of the present invention in that the density of SLEP 3 0.91 g/cc.

Table 10 compares the film physical properties of the comparative Example 1 film and the Inventive Example 2 film. The comparison indicates that multilayer film made in accordance with the invention disclosed herein exhibits film optical and strength properties equivalent to a commercially representative film, Example 1.

TABLE 10

| Property | | Example 1* | Example 2 | Test Method |
|---|---|---|---|---|
| 45° Gloss | | 62 | 66 | ASTM D-2457 |
| Percent Haze | | 5.76 | 4.32 | ASTM D-1003 |
| Dart Impact, g | | 115 | 149 | ASTM D-1709 (METHOD A) |
| Puncture, ft-lb/in$^3$ | | 183 | 191 | Described |
| (kg-cm/cm$^3$) | | (131) | (161) | Below |
| Tensile Strength, psi (MPa) | MD | 7,108 (49.0) | 7,666 (52.8) | ASTM D-882 |
| | CD | 4,574 (31.5) | 3,158 (21.7) | |
| Tensile Yield, psi (MPa) | MD | 1,397 (9.6) | 1,279 (8.8) | ASTM D-882 |
| | CD | 1,211 (8.3) | 1,074 (7.4) | |
| Percent Elongation | MD | 478 | 524 | ASTM D-882 |
| | CD | 739 | 634 | |

*Not an example of the present invention; provided for comparative purposes only.

Puncture is determined using a Instron Model 4201 Tensiometer fitted with a film specimen holder at its lower jaw and a semi-spherical aluminum tip probe at its upper jaw. The tensiometer is operated at cross-head speed of 25 mm/minute and utilizes a 45 kg load cell.

In an observed cling evaluation according to ASTM D-4649 § A1.2.3, the multilayer films of Inventive Examples 2–5 are tested for cling performance. The equipment used for this evaluation is a Lantech Model SHS Power Pre-Stretch Pallet Wrapper set for 200% film pre-stretching and 200% on-pallet film stretching. The palletization load consists of a 500-pound (227-kilogram) 5 foot×4 foot×4 foot (1.5 meter×1.2 meter×1.2 meter) angle-iron frame. Each film is separately wrapped five times about the frame and thereafter slit cut and checked for respective cling properties. All of the Inventive Examples (Examples 2–5) exhibit "excellent cling" in this evaluation.

We claim:

1. A multilayer cling film comprising at least two layers wherein said layers comprise a reverse layer and an obverse layer, the reverse layer comprising at least one film-forming substantially linear ethylene polymer without tackifier therein and characterized as having:
a) a melt flow ratio, $I_{10}/I_2, \geq 5.63$,
b) a molecular weight distribution, $M_w/M_n$, defined by the equation:

$$M_w/M_n \leq (I_{10}/I_2) - 4.63,$$

c) a critical shear rate at onset of surface melt fracture of at least 50 percent greater than the critical shear rate at the onset of surface melt fracture of a linear ethylene polymer having about the same $I_2$ and $M_w/M_n$,
d) a density of about 0.90 g/cc or less,
e) a short chain branching distribution index (SCBDI), as determined using temperature rising elution fractionation, greater than 50 percent, and
f) a n-hexane solubility of at least 90 percent, based on the weight of the polymer composition, under extraction conditions defined in 21 CFR § 177.1520(c), and the obverse layer comprising at least one film-forming olefin polymer composition having a density greater than about 0.90 g/cc.

2. The multilayer film of claim 1 where the film is an A/B two layer structure.

3. The multilayer film of claim 1 where the film additionally comprises at least one core or structural layer.

4. The multilayer film of claim 3 where the core or structural layer comprises at least one ethylene polymer composition.

5. The multilayer film of claim 4 where the ethylene polymer composition is an interpolymer of ethylene with at least one $C_3$–$C_{20}$ α-olefin.

6. The multilayer film of claim 4 where the ethylene polymer composition is linear ethylene/α-olefin interpolymer.

7. The multilayer film of claim 3 where the film is an A/B/C three layer structure.

8. The multilayer film of claim 1 where the substantially linear ethylene polymer is an interpolymer of ethylene with at least one $C_3$–$C_{20}$ α-olefin.

9. The multilayer film of claim 1 where the density of the reverse layer is from about 0.85 g/cc to about 0.89 g/cc.

10. The multilayer film of claim 1 where the olefin polymer composition is a propylene or ethylene polymer.

11. The multilayer film of claim 1 where the olefin polymer composition is a linear ethylene α-olefin interpolymer.

12. The multilayer film of claim 1 where the obverse layer comprises polypropylene and high density polyethylene.

13. The multilayer film of claim 1 where the obverse layer comprises low density polyethylene and linear low density polyethylene.

14. The multilayer film of claim 1 where the density of the obverse layer is from about 0.91 g/cc to about 0.96 g/cc.

15. The multilayer film of claim 1 wherein the substantially linear ethylene polymer is further characterized as having from about 0.01 long chain branch/1000 carbons to about 3 long chain branches/1000 carbons along the polymer backbone.

* * * * *